United States Patent [19]

Erickson et al.

[11] Patent Number: 4,901,219
[45] Date of Patent: Feb. 13, 1990

[54] PLUG-IN POWER SUPPLY

[75] Inventors: Kenneth W. Erickson, Alburnette, Iowa; Henry J. Zylstra, Lincoln, Nebr.

[73] Assignee: Square D Company, Palatine, Ill.

[21] Appl. No.: 136,587

[22] Filed: Dec. 22, 1987

[51] Int. Cl.⁴ .......................................... H02M 1/00
[52] U.S. Cl. ................................. 363/146; 361/355
[58] Field of Search ............... 363/89, 146; 361/346, 361/353, 355, 361; 307/66, 149, 150; 335/14, 20

[56] References Cited

U.S. PATENT DOCUMENTS

| | | | |
|---|---|---|---|
| 3,331,013 | 7/1967 | Cunningham | 363/146 X |
| 3,868,562 | 2/1975 | Marshall | 363/53 |
| 4,015,171 | 3/1977 | Miller | 361/18 |
| 4,025,823 | 5/1977 | Lang et al. | 361/111 |
| 4,079,439 | 3/1978 | Coles et al. | 361/355 |
| 4,168,514 | 9/1979 | Howell | 361/56 |
| 4,205,361 | 5/1980 | Shimp | 361/92 |
| 4,281,359 | 7/1981 | Bayer et al. | 361/393 X |
| 4,472,761 | 9/1984 | Koslosky et al. | 361/355 |
| 4,541,030 | 9/1985 | Biegelmeier | 361/56 |
| 4,642,733 | 2/1987 | Schacht | 361/346 |

FOREIGN PATENT DOCUMENTS 0155674 9/1983 Japan .................................... 363/146

*Primary Examiner*—Patrick R. Salce
*Assistant Examiner*—Kristine Peckman
*Attorney, Agent, or Firm*—Jose W. Jimenez; Thomas B. Lindgren

[57] ABSTRACT

A plug-in power supply includes a housing dimensioned to fit into a space designed to accept a circuit breaker in a load center to provide D.C. power from an A.C. main power. The housing encloses a circuit card that has components that are connected between A.C. inlet terminals and D.C. output terminals to provide a peak current for a short duration, limit the output to a D.C. voltage maximum, and interrupt the output current when the output voltage drops below a certain level.

32 Claims, 3 Drawing Sheets

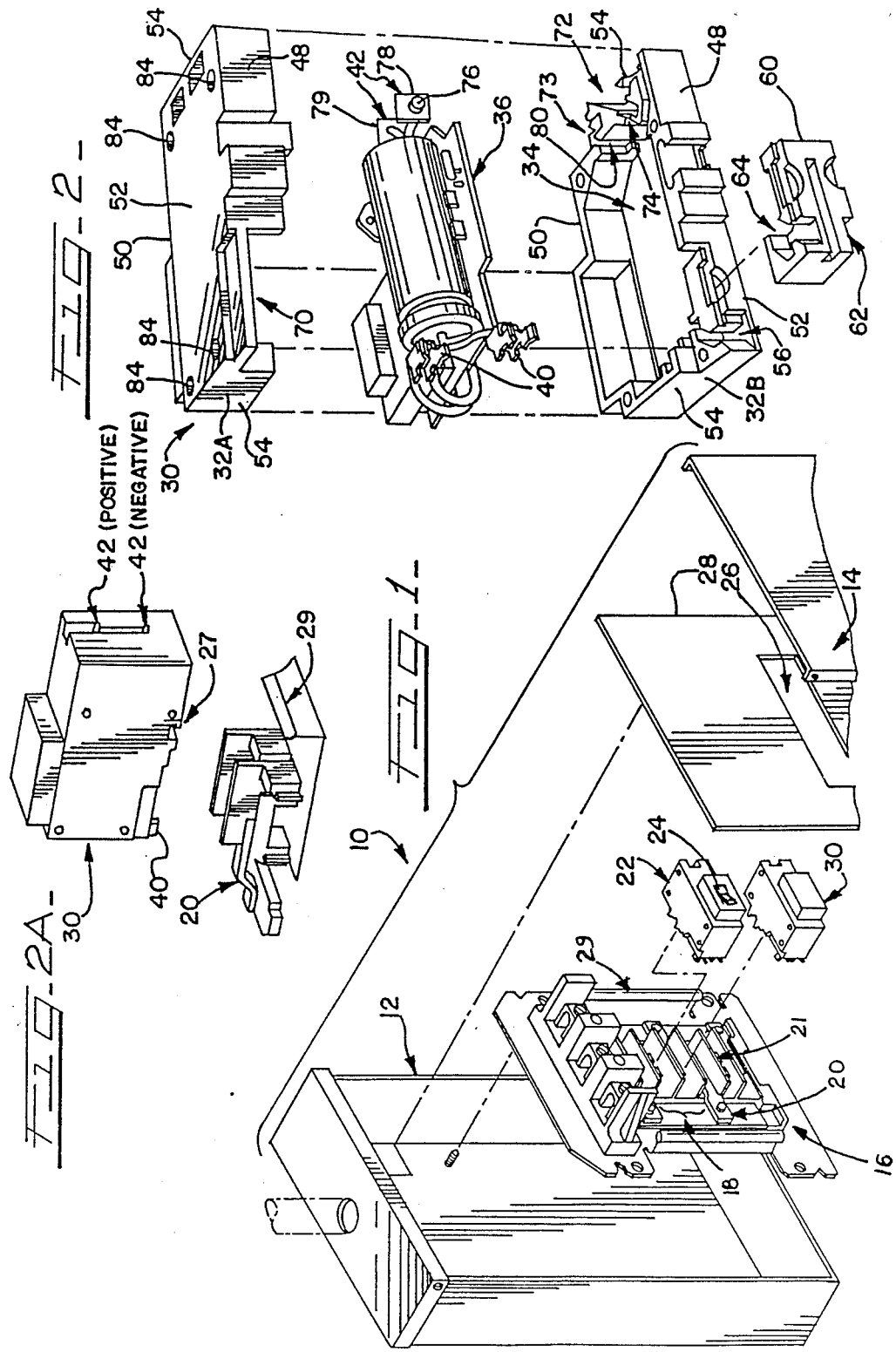

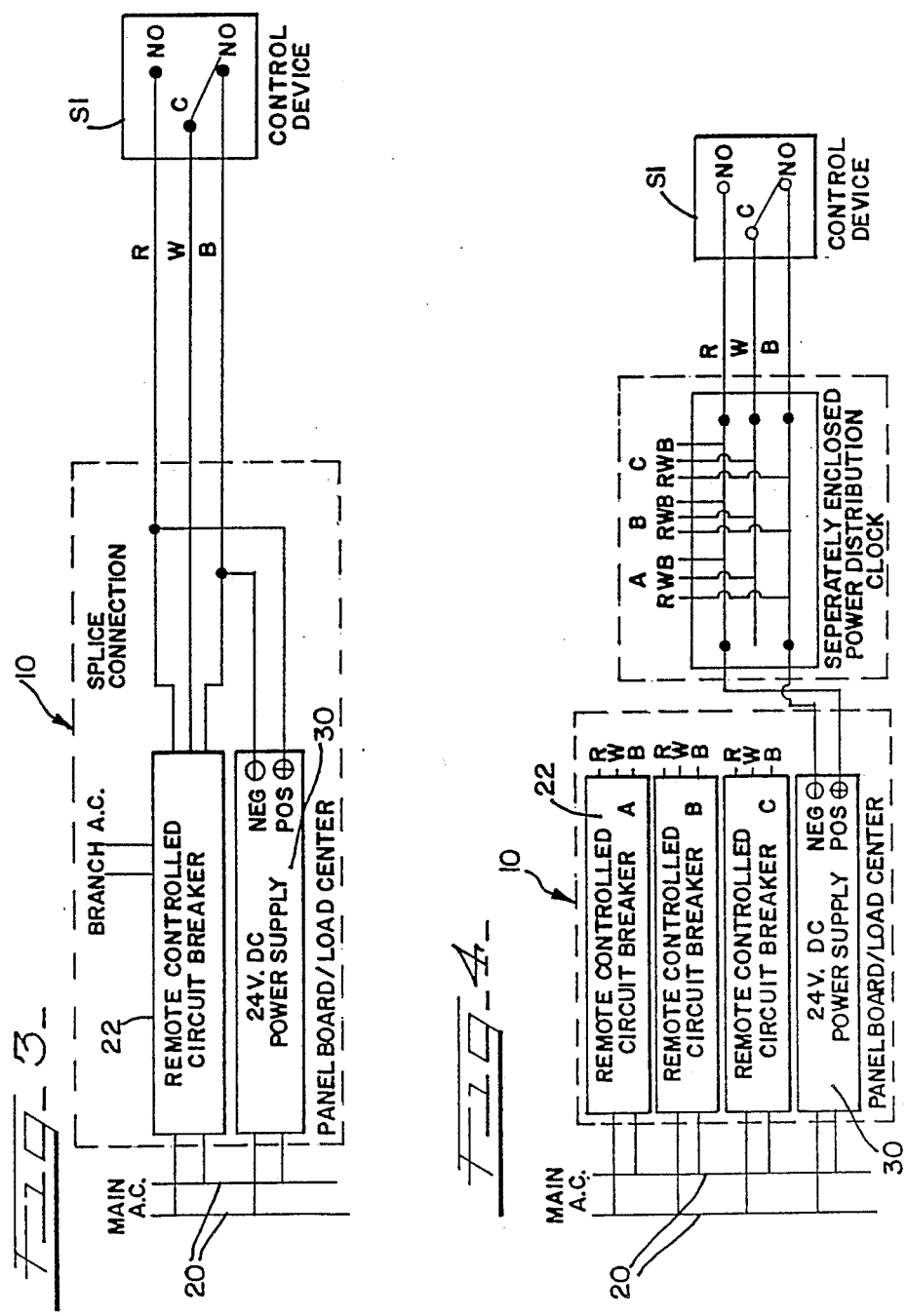

PLUG-IN POWER SUPPLY

DESCRIPTION

1. Technical Field

The present invention relates to a power supply for providing D.C. voltage from an A.C. source and more particularly to a plug-in power supply for use in a conventional circuit breaker load center.

2. Background Art

Conventional circuit breaker load centers distribute electrical power from an A.C. main circuit to A.C. branch circuits. Such a load center generally includes a mounting panel or pan that is mounted in an enclosure and that has openings for receiving circuit breakers. The A.C. main circuit inside the load center consists of phases of buses or conductor bars insulatively mounted in the enclosure and accessible at the openings.

Conventional circuit breakers are mounted in the load center at the openings and are electrically connected to the phases buses through receptacle slots. The circuit breakers also operatively connect to load terminals of the branch circuits and have trip levers which extend through openings in a dead-front panel mounted on the enclosure. Conventional circuit breakers interrupt the current flow from the main to the branch circuits to protect against overloads, and the levers are used to reset the breakers.

Recently circuit breakers have been developed that can be remotely controlled. Such breakers normally require manual resetting after being remotely tripped.

A most recent development by the Assignee of the present invention is a circuit breaker that trips to provide for overcurrent as well as short circuit protection and can also remotely opened and closed without affecting the tripping function. This capability is provided by a compact motor located within the breaker enclosure and operating at 12 to 24 volts D.C. in response to operation of a remote switch. A problem occurs in that 12-24 volts D.C. is not normally available in a typical load center installation. Providing a separate D.C. power supply requires a craftsman to install an additional 24 volt D.C. power supply. Such a supply, moreover, is selected to supply continuously the peak current required for the circuit breaker motor, even though the motor requires that peak current normally only for a short non-continuous period.

Installing the remote-controlled circuit breaker thus became expensive in cost of parts and labor to install the additional power supply. If the supply misfunctions, trained personnel must be used to fix it. Further, the higher rated D.C. supply is expensive and dissipates energy while waiting to operate the remote-controlled breaker.

SUMMARY OF THE INVENTION

According to the present invention, a small, compact power supply has been developed that mounts in the space normally occupied by a conventional circuit breaker in a load center to provide the D.C. power for operating a D.C. motor that is incorporated into an adjacent, remote-controlled circuit breaker. Further, the supply provides the peak current required for operating the remote-controlled breaker or breakers on a cycled or non-continuous basis. This adequately services the remote-controlled breaker or breakers while reducing the size of the supply to that of a double width circuit breaker package. This also reduces the power consumption and heat dissipation between supplying power to the remote-controlled circuit breaker.

The plug-in power supply consists of a housing that is dimensioned to fit into a space normally occupied by a circuit breaker in a load center. The housing has input terminals that are connected to an A.C. main circuit in the load center and encloses a circuit card carrying components that convert the A.C. power to a low voltage D.C. output.

The housing has a top wall, a bottom wall, opposite side walls and opposite end walls with the input terminals on the bottom wall and D.C. output terminals on one end wall so that the output terminals are exposed and accessible for connection to an adjacent remote-controlled circuit breaker.

The components of the circuit card control the output of power to the load or remote-controlled breaker by limiting the voltage to a maximum of approximately 24 volts, turning off the D.C. output power when the voltage drops below a certain level of approximately 12 volts, and then turning on the output when the supply is again capable of providing the maximum voltage.

More specifically, the circuit means in the housing includes component means for sourcing a high peak current of approximately 6 amperes for a short period of time of approximately 100 milliseconds and a much lower current level of approximately 100 milliamperes the remainder of the time. The circuit means also includes limit means in the form of timer means for interrupting the D.C. power supply for a certain length of time of approximately one second when the voltage thereof falls below a certain level of approximately 12 volts.

BRIEF DESCRIPTION OF DRAWINGS

FIG. 1 is an exploded perspective view of a load center incorporating the present supply of the present invention;

FIG. 2 is an exploded view of the components of the plug-in power supply;

FIG. 2A is a perspective view of the plug-in power supply;

FIG. 3 is a schematic illustration showing the line and load connections between the power supply and the remote-controlled circuit breaker;

FIG. 4 is a view similar to FIG. 3 showing the manner in which a single power supply can be used to operate a plurality of remote-controlled circuit breakers;

DETAILED DESCRIPTION

Figure 5:
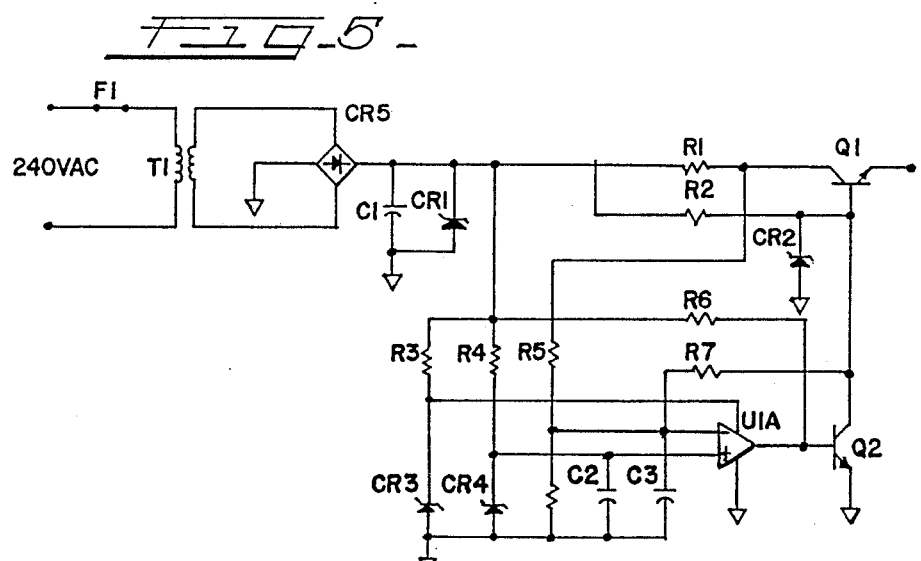
FIG. 5 is a schematic diagram of the circuit for the power supply.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiment illustrated.

Referring to FIG. 1 of the drawings, an electrical control panel or load center is generally designated by reference numeral 10. The load center consists of an enclosure 12 that has a cover 14 adapted to be secured to the open end and close the front of the enclosure.

Mounted within the enclosure 12 is an interior mounting pan or panel 16 carrying a molded insulating connector block 18 electrically connected to phase buses 20 that are insulatively mounted on the interior mounting pan. Phase buses 20 connect to the A.C. main circuit, not shown, of typically 208 or 240 volts A.C. Connector block 18 provides plural receptacle slots 21 and terminals therebehind for positive connection to terminals inserted therein. These slots 21 are provided at regularly-spaced distances to receive desired circuit breakers at standard dimensions.

A plurality of circuit breakers 22 (one being shown) are normally inserted into the regularly-spaced slots 21 in the connector block 18 and are connected to load terminals (not shown) of branch circuits leading from the load center. The circuit breakers 22 have levers 24 which are exposed through openings 26 located at equally-spaced intervals in a dead-front panel 28.

It should be noted that the load center illustrated in the drawings is considered conventional and the configuration may vary depending upon the manufacturer. For example, the mounting pan could be eliminated and the components could be mounted directly on the back wall of the enclosure.

Also referring to FIG. 1, a plug-in power supply 30 of the invention fits into a space in the load center that is normally occupied by a conventional circuit breaker 22. Referring now to FIG. 2, plug-in power supply 30 includes a housing consisting of two mating halves 32A and 32B that define a chamber 34, which contains a circuit card assembly 36. The circuit card 36 supports components that convert the A.C. voltage from the main circuit, received at input terminals 40, to D.C. power supplied to the output terminals 42. The housing has a bottom wall 48, a top wall 50, side walls 52 and end walls 54.

According to one aspect of the invention, the housing is configured and designed such that the input and output terminals are held in a fixed position without any fastener means. The lower housing half 32B has a recess 56 at one corner thereof, which recess opens to the bottom wall 48 of the housing. A terminal support bracket 60 has a lower recess 62 at one corner thereof that is designed to receive an exposed portion of a terminal clip 40 that is located in the recess 56.

The terminal support bracket 60 also has an upper recess 64 that is adapted to receive the second clip or terminal 40. The upper housing half 32A has a recess 70 that is designed to receive the bracket 60 when the two mating halves are secured to each other. The input terminals 40 thus become clamped and secured in the recesses by support bracket 60 when the two mating halves are joined and secured together The two output terminals 42 are also held in a fixed position without the use of any fastener and are positioned such that they are exposed towards the top wall 50 of the housing. The lower housing 32B has a first slot 72 adjacent the lower corner of the housing portion that extends at about a 45° angle to the end wall 54. Lower housing also has a transversely-extending slot 74 from slot 72 into chamber 34. The recess 72 receives the shank of a threaded fastener 76, such as a headed screw, that forms part of the terminal 42. The slot 74 receives one of a pair of contact plates 78 that are held together by the fastener 76. Thus, the head portion of the fastener 76 is exposed at a 45° angle to the top wall for easy access for connection of a lead line thereto, as will be explained below.

The one plate engages the threaded shank of the screw 76 and the other plate floats above the one plate and the head of the screw. In this manner, joining and mating the two housing halves clamps and secures the one plate of pair 78 in slot 74 for connection to card assembly 36. The screw can rotatively move longitudinally of slot 72 to clamp a connector between the two plates and secure the connector between the one threaded plate and the floating plate.

The second terminal 42 is positioned in the housing such that its threaded fastener or screw extends parallel to the end wall 54 in slot 73 while its pair of contact plates 79 extend perpendicular to end wall 54 through a slot 80. Thus, the screw head of the second fastener is located adjacent the top wall and is easily accessible through a tool, such as a screwdriver, for connecting a wire thereto. The two input terminals 40 and the two output terminals 42 connect to the circuit card assembly through wires as may be desired.

After the components have been positioned, as illustrated, the two housing halves 32A and 32B are secured to each other through the use of fasteners that extend through openings 84 in the respective corners of the housing halves. Thus, it will be appreciated that a very compact system or package has been developed that can easily be assembled and that will hold all of the components in a fixed position for easy access thereto. This facilitates economical production of the supply in a small package.

The front portion of the plug-in power supply 30 protrudes from a space 26 in control panel lo with the terminals 40 received into slots 21 and a mounting clip 27 received onto a mounting rail 29 (FIG. 2A).

Referring to FIG. 5, power from a 240-volt A.C. power source is connected to the primary winding of transformer T1 through fuse F1. The output of the transformer T1 is 36 volts at the secondary winding A.C. RMS. Through bridge rectifier CR5, this charges up a storage capacitor C1 to a maximum of 47 volts, limited by the zener diode CR1. A high voltage on the input line, 264 volts for example, will not overstress the capacitor C1 since the voltage is limited by diode CR1.

The remainder of the components are used to control the application of power to the load. That is, (1) to limit the output voltage to approximately 24 volts; (2) to turn off the power supply when the output voltage drops to about 12 volts; and, (3) to turn the output on again when the supply is capable of delivering 24 volts again.

Power is applied to the load through the transistor Q1 and resistor R1. The transistor Q1 is turned on by the application of base current through resistor R2. The zener diode CR2 limits the drive to the base of transistor Q1 such that the output of the power supply does not exceed a normal voltage of 24 volts. Resistor R1 limits the current in the event of a short circuit on the output of the power supply.

Additional control of transistor Q1 and therefore the output of the power supply is provided by the voltage comparator U1 the transistor Q2 and the associated resistors. To explain the operation of this control circuit, assume the capacitor C1 is charged to 40 volts and a voltage is applied to the load through transistor Q1. The voltage applied to the inverting terminal of the comparator U1 will be determined by two voltage dividers; one made up of resistors R8 and R5 connected between the collector of transistor Q1 and ground and the voltage divider made up of resistors R5 and the parallel connection of resistors R7 and R8.

The voltage applied at the inverting terminal will be approximately 15 volts when C1 is charged to 40 volts. The voltage applied to the non-inverting input of the voltage comparator U1 will be nominally 6.2 volts limited by the 6.2 volt zener diode CR4. This results in the output of the voltage comparator U1 being low since the inverting input exceeds the non-inverting input. Since the output of the voltage comparator is low, the transistor Q2 does not receive any base drive and, in turn, the collector does not draw any current. If a load draws more than about 100 milliamperes from the output of the power supply, the current going out of the supply to the load will exceed that being supplied by the transformer and the capacitor C1 will discharge. When the voltage on the capacitor C1 drops to approximately 12 volts, the voltage on the non-inverting terminal exceeds the voltage on the inverting input of the comparator and the voltage on the output of the voltage comparator goes to the high state, resulting in transistor Q2 being turned on, removing the base drive to transistor Q1 and thereby turning off transistor Q1. With the base drive removed, no current is delivered to the load, allowing capacitor C1 to charge up again.

During this charge time, the status of transistors Q1 and Q2 will be determined by the state of the voltage comparator output. Since the resistor R7 now connects the junction of the non-inverting comparator and R5 to nearly ground through the saturated transistor Q2, a higher voltage will be needed on capacitor C1 to change the state of the voltage comparator output. The non-inverting input remains at 6.2 volts due to the zener diode CR4, while the voltage of the inverting input is determined by the voltage divider R5 and the parallel combination of resistors R7 and R8. When the voltage on the capacitor reaches about 28 volts, the output of the voltage comparator changes from a high state to a low state, transistor Q2 is turned off and transistor Q1 conducts again, delivering power to the load.

Figure 6:
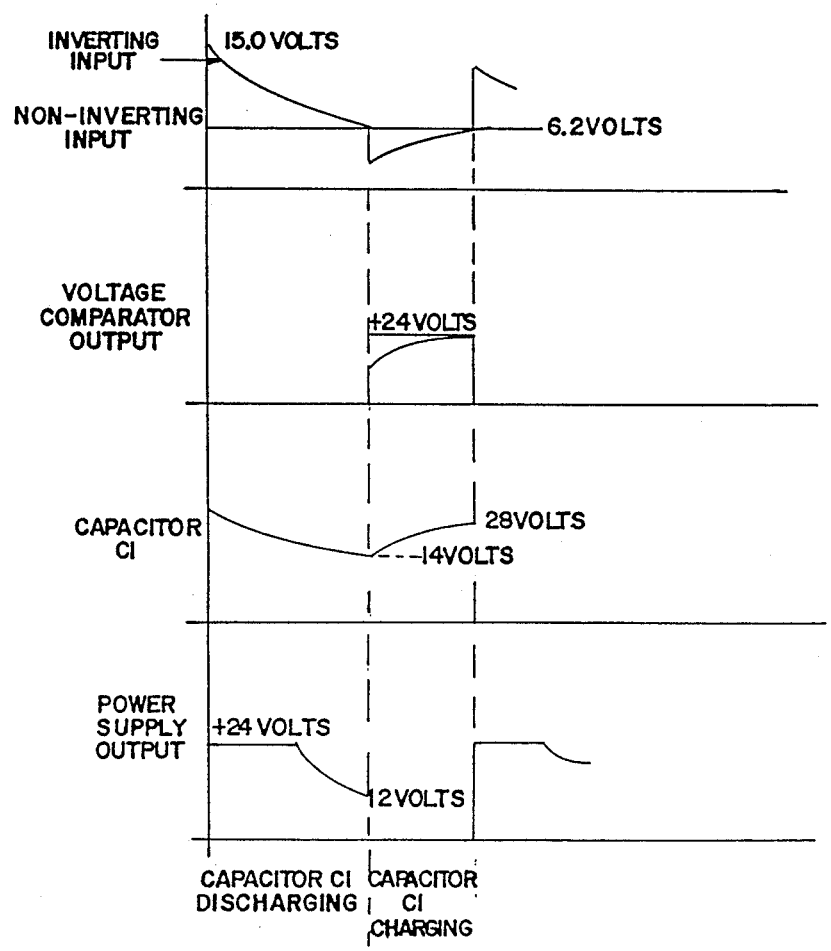
FIG. 6 shows different waveforms created by the power supply.

The voltage waveforms of the voltage comparator input and output, capacitor C1 voltage and the power supply output are shown in FIG. 6. The waveforms and previous discussion pertain only to relatively higher load currents. The performance into lighter loads would be such that a continuous voltage would be delivered to the load.

Capacitors C2 and C3 are small capacitors which provide high frequency noise suppression on the inputs to the voltage comparator. The resistor R3 in conjunction with the zener diode CR3 limits the voltage provided to the voltage comparator. Resistor R4 limits current flow through zener diode CR4.

Typical values for the components of the circuit are:

| | |
|---|---|
| R1 | 2 ohms, 2 watts |
| R2 | 1.5 k ohms, 2 watts, all resistor values are 0.25 watt unless otherwise noted |
| R3 | 1.2k ohms, 0.5 watt |
| R4 | 47k ohms |
| R5 | 130K ohms |
| R6 | 18k ohms |
| R7 | 100k ohms |
| R8 | 56k ohms |
| C1 | 4700 microfarads |
| C2 | 0.01 microfarads |
| C3 | 0.01 microfarads |
| CR1 | IN4756, 47 volts |
| CR2 | IN4749, 24 volts |
| CR3 | IN4750, 27 volts |

-continued

| | |
|---|---|
| CR4 | IN4735, 6.2 volts |
| Q1 | TIP140 |
| Q2 | 2N3904 |
| U1A | LM811 |

FIGS. 3 and 4 of the drawings show the power supply of the present invention incorporated into a load center. A remotely-controlled circuit breaker 22 is interposed between an A.C. main circuit voltage source and an A.C. branch circuit. The remotely-controlled breaker 22, which has a D.C. motor incorporated therein, is connected through leads R, W and B to contacts of a remotely-controlled device or switch S1. The positive and negative contacts of the output terminals of the power supply 30 respectively connect to the lines R and B. Thus, when the switch S1 is operated, power is supplied to the D.C. motor from the 24-volt plug-in power supply to the remotely-controlled circuit breaker.

FIG. 4 discloses a power management system including a load center having a plurality or three remotely-controlled circuit breakers or control means 22 supplied with D.C. power from a single power supply 30. Thus, as disclosed therein, the output of the power supply is connected to a power distribution block, which is interposed between the remotely-controlled switch S1 and the respective circuit breakers 22. The separate power distribution block will, thus, provide power to the three remote circuit breakers upon the actuation of switch S1.

While the power management system of FIG. 4 shows the control means as circuit breakers, other D.C.-powered devices could be used.

While the specific embodiments have been illustrated and described, numerous modifications can be made without significantly departing from the spirit of the invention and the scope of protection is only limited by the scope of the accompanying claims.

I claim:

1. A plug-in power supply for a load center distributing electrical power from line terminals to load terminals of at least one branch circuit, said load center having a mounting panel having line and load terminals accessible through said panel and grouped at regularly spaced intervals normally for accepting circuit breakers, and having an A.C. power source in communication with said line terminals, said power supply comprising a housing dimensioned to be inserted into an interval normally occupied by a circuit breaker, said housing having input terminals adapted to engage said line terminals through said mounting panel to receive said A.C. power, and circuit means within said housing providing a regulated source of D.C. electrical power to output terminals from said A.C. power.

2. A plug-in power supply as defined in claim 1, in which said housing has a top wall, a bottom wall, side walls and end walls with said input terminals in said bottom wall and said output terminals in one of said end walls.

3. A plug-in power supply as defined in claim 1, in which said circuit means include component means for sourcing a high peak current for a short period and a low current level continuously.

4. A plug-in power supply as defined in claim 3, in which said high peak current is approximately two amperes, said period is approximately fifty milliseconds, and said low current is on the order of 100 milliamperes.

5. A plug-in power supply as defined in claim 3, in which said circuit means further includes limit means for interrupting said D.C. electrical power supply when the voltage thereof falls below a certain level.

6. A plug-in power supply as defined in claim 5, in which said D.C. electrical power supplies approximately 24 volts and said certain level is approximately 12 volts.

7. A plug-in power supply as defined in claim 5, in which said limit means include timer means for interrupting said D.C. electrical power supply for a certain length of time when the voltage thereof falls below a certain level.

8. A plug-in power supply as defined in claim 7, in which said certain length of time is approximately one second.

9. A plug-in power supply as defined in claim 2, in which said panel includes a mounting rail and said bottom wall includes a mounting clip engaging with said rail to positively mount said housing to said panel.

10. A load center for distributing electrical power from an A.C. main circuit to at least one branch A.C. circuit, said load center comprising a mounting panel, line and load terminals grouped together at regularly spaced intervals and accessible through said mounting panel, said line terminals connected to said A.C. main circuit and one group of said load terminals connected to said at least one branch A.C. circuit, breaker means connected across said grouped line terminals and said load terminals of said at least one branch circuit at one interval, said breaker means having D.C. motor means operated by remote switch means for opening and closing an electrical connection between said line and load terminals within said breaker means, and D.C. power supply means connected to said grouped line terminals through said mounting panel at an interval proximate said breaker means, said D.C. power supply means having output terminals operatively connected to said motor means and supplying D.C. electrical power to said motor means from said A.C. main circuit.

11. A load center as defined in claim 10, in which said D.C. power supply means includes a housing dimensioned to be received into said another interval and defining a chamber with a circuit card in said chamber and carrying components for converting A.C. power to D.C. power.

12. A load center as defined in claim 11, in which said housing has a top wall, a bottom wall, side walls and end walls, and in which said bottom wall has terminals for connection to said A.C. main circuit and one of said end walls has output terminals connected to said motor means.

13. A load center as defined in claim 11, in which said components include means for sourcing high peak current for a short period of time and a low current level continuously.

14. A load center as defined in claim 13, in which said components include limit means for interrupting said D.C. electrical power when the voltage thereof falls below a certain level.

15. A load center as defined in claim 11, in which said mounting panel has a grounded mounting rail and said housing has a mounting clip engaging with said rail to mount said housing to said panel.

16. A plug-in power supply for supplying D.C. power from an A.C. source of power, said power supply comprising a rectangular housing dimensioned to be inserted into an interval of a load center normally mounting circuit breakers at regular intervals, said housing defining a hollow chamber, a circuit card carrying components contained within said chamber, a pair of input terminals supplying said A.C. power mounted on said housing at a distance from one another adapted to engage with line terminals connected to said A.C. source in a load center, a pair of output terminals mounted on said housing and adapted to be accessible when said power supply is mounted on a mounting panel of a load center, and connection means for connecting said input terminals to said components on said circuit card and for connecting said output terminals to said components on said circuit card.

17. A plug-in power supply as defined in claim 16, in which said components include means for sourcing a high peak current for a short period of time.

18. A plug-in power supply as defined in claim 17, in which said components include limit means for interrupting said D.C. power supply when the voltage thereof falls below a certain level.

19. A plug-in power supply as defined in claim 18, in which said D.C. power supplies approximately 24 volts and said certain level is approximately 12 volts.

20. A plug-in power supply as defined in claim 16, in which said housing includes a pair of housing halves adapted to be separated to receive said circuit card, said output terminals being located in an end wall of said housing and said input terminals being located in a bottom wall of said housing, said output terminals each including a pair of contact plates interconnected by a threaded fastener with a first of said terminals having its fastener extending generally parallel to said end wall and a second of said terminals having its fastener angularly related to said end wall.

21. A plug-in power supply device for electrical wiring systems including plug-in circuit breakers within a load center enclosure, the load center enclosure containing within it:
 (i) a plurality of branch circuit breakers with operating levers;
 (ii) an interior mounting pan having openings through which said branch circuit breakers are mounted;
 (iii) a plurality of buses, said buses mounted insulatively from each other upon said interior mounting pan, said branch circuit breakers electrically connected to said buses;
 (iv) mounting pan supporting means;
 (v) a dead-front panel having apertures aligned with the operating levers of said branch circuit breakers and means securing said dead-front panel to the enclosure; and
 (vi) a system neutral and grounding bus in said enclosure, the power supply device comprising:
   (a) a housing dimensioned to be inserted into an opening normally occupied by a circuit breaker, said housing having connection means connected to said buses and having retention means attached to said mounting pan, and having load side terminals; and
   (b) circuit means within said housing for providing D.C. electrical power, said circuit means being connected between said buses and said load side terminals of said device.

22. A plug-in power supply device for electrical wiring systems including plug-in circuit breakers within a load center enclosure, the load center enclosure containing within it:

(i) a plurality of branch circuit breakers with operating levers;
(ii) an interior mounting pan having openings through which said branch circuit breakers are mounted;
(iii) a plurality of buses, said buses mounted insulatively from each other upon said interior mounting pan, said branch circuit breakers electrically connected to said buses;
(iv) mounting pan supporting means;
(v) a dead-front panel having apertures aligned with the operating levers of said branch circuit breakers and means securing said dead-front panel to the enclosure; and
(vi) a system neutral and grounding bus in said enclosure, the power supply device comprising:
 (a) a housing dimensioned to be inserted into an opening normally occupied by a circuit breaker, said housing having connection means connected to said buses and having retention means attached to said mounting pan, and having load side terminals; and
 (b) circuit means within said housing for providing power, said circuit means being connected between said buses and said load side terminals of said device, said circuit means including means for sourcing a high peak current for a short period of time.

23. A plug-in power supply device for electrical wiring systems including plug-in circuit breakers within a load center enclosure, the load center enclosure containing within it:
(i) a plurality of branch circuit breakers with operating levers;
(ii) an interior mounting pan having openings through which said branch circuit breakers are mounted;
(iii) a plurality of buses, said buses mounted insulatively from each other upon said interior mounting pan, said branch circuit breakers electrically connected to said buses;
(iv) mounting pan supporting means;
(v) a dead-front panel having apertures aligned with the operating levers of said branch circuit breakers and means securing said dead-front panel to the enclosure; and
(vi) a system neutral and grounding bus in said enclosure, the power supply device comprising:
 (a) a housing dimensioned to be inserted into an opening normally occupied by a circuit breaker, said housing having connection means connected to said buses and having retention means attached to said mounting pan, and having load side terminals; and
 (b) circuit means within said housing for providing D.C. electrical power, said circuit means being connected between said buses and said load side terminals of said device, said circuit means including limit means for interrupting said D.C. electrical power when the voltage thereof falls below a certain level.

24. A plug-in power supply for supplying D.C. power from an A.C. source of power, said supply comprising a rectangular housing having dimensions adapted to fit an interval of a load center normally mounting circuit breakers at regular intervals, said housing including a pair of mating members adapted to be interconnected to define a chamber, a circuit card carrying components contained within said chamber and having a pair of A.C. input terminals in one wall of said housing and a pair of D.C. output terminals in an adjacent wall of said housing.

25. A plug-in power supply as defined in claim 24, in which said housing has a top wall, a bottom wall, a pair of side walls and a pair of end walls with said A.C input terminals located in said bottom wall and said D.C. output terminals in one of said end walls.

26. A plug-in power supply as defined in claim 25, in which said mating members define a recess at one corner of said housing with a terminal support bracket received into said recess, said mating members and said terminal support bracket cooperating to hold said pair of A.C. input terminals in spaced fixed relation to each other.

27. A plug-in power supply as defined in claim 26, in which said pair of D.C. output terminals are angularly positioned with respect to each other to be accessible from adjacent said top wall.

28. A power management system comprising a load center for distributing electrical power from a main A.C. circuit to a plurality of branch A.C. circuits, said center including a mounting panel, line and load terminals grouped together at regularly spaced intervals and accessible through said mounting panel, said line terminals being connected to said main circuit and said load terminals being connected to said branch circuits, at least one control means connected across said grouped line terminals and said load terminals at one interval, said at least one control means requiring D.C. power for controlling the electrical connection between said line and load terminals within said control means, and D.C. power supply means connected to at least said line terminals at another interval, said supply means having output terminals operatively connected to said at least one control means so that D.C. power is supplied to said control means from said D.C. power supply means.

29. The energy management system of claim 28, including power distribution means for connecting said supply means to said at least one control means.

30. The energy management system of claim 29, in which there are plural control means requiring D.C. power and said supply means connect to said plural control means in parallel.

31. The energy management system of claim 30, in which said control means include a circuit breaker for opening and closing the connection between said line and load terminals.

32. The energy management system of claim 28, in which said control means include a circuit breaker operating under direction of a remote switch for opening and closing the connection between said line and load terminals.

* * * * *